(12) United States Patent
Faerevaag (10) Patent No.: US 10,077,994 B2
(45) Date of Patent: Sep. 18, 2018

(54) LOW ENERGY SENSOR INTERFACE

(75) Inventor: Erik Fossum Faerevaag, Bergen (NO)

(73) Assignee: SILICON LABORATORIES NORWAY AS, Oslo (NO)

( * ) Notice: Subject to any disclaimer, the term of this patent is extended or adjusted under 35 U.S.C. 154(b) by 678 days.

(21) Appl. No.: 13/877,371

(22) PCT Filed: Nov. 8, 2011

(86) PCT No.: PCT/IB2011/002945
§ 371 (c)(1),
(2), (4) Date: Apr. 2, 2013

(87) PCT Pub. No.: WO2012/063129
PCT Pub. Date: May 18, 2012

(65) Prior Publication Data
US 2013/0218524 A1 Aug. 22, 2013

Related U.S. Application Data

(60) Provisional application No. 61/411,329, filed on Nov. 8, 2010.

(51) Int. Cl.
| | |
|---|---|
| *H03F 1/26* | (2006.01) |
| *H04B 15/00* | (2006.01) |
| *G01D 21/00* | (2006.01) |
| *G05B 19/042* | (2006.01) |
| *G06F 1/32* | (2006.01) |

(52) U.S. Cl.
CPC ......... *G01D 21/00* (2013.01); *G05B 19/0423* (2013.01); *G06F 1/3215* (2013.01)

(58) Field of Classification Search
CPC ....................................................... G01D 21/00
USPC ....................................................... 702/189
See application file for complete search history.

(56) References Cited

U.S. PATENT DOCUMENTS

| | | | | |
|---|---|---|---|---|
| 3,297,996 A | * | 1/1967 | Grady | .................... G06F 7/785 710/52 |
| 5,905,902 A | * | 5/1999 | O'Connor | .......... G05B 19/0426 711/118 |

(Continued)

FOREIGN PATENT DOCUMENTS

EP 2199881 A1 6/2010

OTHER PUBLICATIONS

Janbu "Energy debugging—the next step in MCU software optimization", posted on Jun. 1, 2010 at http://www.techdesignforums.com/practice/technique/energy-debugging-the-next-step-in-mcu-software-optimization/.*

(Continued)

*Primary Examiner* — Manuel L Barbee
(74) *Attorney, Agent, or Firm* — Miller, Matthias & Hull LLP (57) ABSTRACT

A low energy sensor interface for a microcontroller unit (MCU) is provided. The sensor interface may include a sequencer in operative communication with one or more on-chip peripherals, a count and compare block in communication with one or more sensors and the sequencer, and a highly configurable decoder. The sequencer, the count and compare block and the decoder may be configured to autonomously analyze and collect sensor results using the on-chip peripherals in a low energy mode of operation without intervention from an associated central processing unit (CPU).

20 Claims, 6 Drawing Sheets

(56) References Cited

U.S. PATENT DOCUMENTS

| | | | | |
|---|---|---|---|---|
| 6,327,508 B1* | 12/2001 | Mergard | ............ | G05B 19/045 |
| | | | | 700/1 |
| 6,363,490 B1* | 3/2002 | Senyk | .................. | G06F 1/206 |
| | | | | 700/204 |
| 2006/0266273 A1* | 11/2006 | Westberg | ............. | B60K 35/00 |
| | | | | 116/62.1 |
| 2009/0187373 A1* | 7/2009 | Atwell | ................. | B25J 9/1692 |
| | | | | 702/152 |
| 2010/0085890 A1* | 4/2010 | Hinnant, Jr. | ......... | G01D 21/00 |
| | | | | 370/253 |
| 2010/0229011 A1 | 9/2010 | Pedersen et al. | | |

OTHER PUBLICATIONS

Gurley Precision Instruments (copyright 1998-2002, downloaded from http://www.gurley.com/Encoders/Understanding_Quadrature.pdf on Mar. 4, 2016).*

International Search Report and Written Opinion for corresponding International Application No. PCT/IB2011/002945, report dated May 2, 2012.

* cited by examiner

FIG. 1

FIG. 2 scan sequence

FIG. 3

Timing diagram, short excitation

FIG. 4

Timing diagram, long excitation

FIG. 5

Timing diagram, no excitation

FIG. 6

Sensor scan and decode sequence

LOW ENERGY SENSOR INTERFACE

CROSS-REFERENCE TO RELATED APPLICATION

This application is a 35 U.S.C. § 371 National Stage filling of International Patent Application No. PCT/IB2011/002945 filed on Nov. 8, 2011 claiming priority under the Paris Convention and 35 U.S.C. § 119(e) to U.S. Provisional Patent Application Ser. No. 61/411,329, filed on Nov. 8, 2010.

BACKGROUND

Technical Field

The present disclosure relates to a sensor interface, and more particularly, to devices and methods for enabling autonomous monitoring of a plurality of sensor types to further reduce power consumption.

Description of the Related Art

Sensor interfaces are commonly used in the electrical arts to collect and process data from one or more sensors of a device. However, collecting sensor data and processing sensor data requires interventions from a central processing unit (CPU), or the like. Such prolonged intervention from a CPU may unnecessarily consume excess energy and reduce the overall battery life of the device being at least partially controlled by the processor. Even a device with a CPU capable of entering into a low energy sleep mode, for example, may still consume a significant amount of energy while collecting and processing sensor data because of frequent interventions by the CPU. Because of such interventions, the CPU may be unable to continuously remain in sleep mode to result in any substantial reduction in the power consumed.

Some existing interface devices may provide a form of autonomous monitoring of sensors so as to reduce the frequency of intervention by the associated CPU and conserve energy. However, such devices may still be incapable of interfacing with a plurality of different sensor types in an efficient manner. Such devices may further lack the configurability required to simultaneously handle and decode a multitude of different sensors individually. Moreover, current systems are deficient in effectively interfacing with certain sensor types, such as capacitive sensors, resistive sensors including light sensors and accelerometers, and the like.

Accordingly, there is a need for improved control systems and methods which provide a sensor interface that overcomes these deficiencies. In particular, there is a need for a low energy sensor interface that is capable of providing autonomous monitoring and analysis of sensors both effectively and efficiently. More specifically, there is a need for an interface capable of individually configurable sensing and decoding means to enable accurate threshold comparisons and state determinations with little to no CPU intervention. There is also a need for an interface that is adaptable for use with a wide range of sensor types including capacitive, inductive-capacitive, resistive as well as other analog sensor types.

SUMMARY OF THE DISCLOSURE

In satisfaction of the aforenoted needs, apparatus and methods for providing a low energy sensor interface are disclosed.

The present disclosure is a low energy sensor interface which utilizes on-chip peripherals in a control system or a microcontroller unit (MCU) to perform measurement of a configurable set of sensors. The results from sensor measurements can be processed by the decoder, which is a configurable state machine with up to 16 states. The results can also be stored in a result buffer to be collected by a central processing unit (CPU) or a direct memory access (DMA) controller for further processing. The present disclosure operates in a low energy mode and only requests intervention from the CPU on certain more demanding configurable events or a sequence of events.

The present disclosure may monitor up to sixteen sensors, provide autonomous sensor monitoring in a low energy mode, provide highly configurable decoding of sensor results, provide interrupt on sensor events, provide configurable enable signals to external sensors and enable circular buffer for result storage. The present disclosure may further provide support for multiple sensor types including but not limited to, for example, capacitive, inductive-capacitive, resistive as well as other suitable analog sensors.

In one aspect of the present disclosure, a low energy sensor interface for a control system or a MCU is provided. The sensor interface may include a sequencer in operative communication with one or more on-chip peripherals, a count and compare block in communication with one or more sensors and the sequencer, and a highly configurable decoder. The sequencer, the count and compare block and the decoder may be configured to autonomously collect and analyze sensor results using the on-chip peripherals in a low energy mode of operation without intervention from an associated CPU.

In a refinement, the highly configurable decoder may be capable of communicating directly with an analog comparator.

In another refinement, the on-chip peripherals may include at least one or more of an analog comparator, a digital to analog converter, an analog to digital converter, a pulse counter and an oscillator.

In another refinement, the sequencer may further be configured to manage timing of sensor measurements.

In another refinement, the sensor interface may further include random access memory (RAM) configured as a circular results buffer for storing operational configurations and measured sensor results.

In another refinement, the highly configurable decoder may define a programmable state machine, wherein the state machine may enable one of a plurality of different states based on the measured sensor results, and wherein each state transition may be associated with a programmable action.

In a related refinement, the state machine may provide at least 16 different programmable states.

In yet another refinement, the decoder may be capable of quadrature decoding.

In another aspect of the present disclosure, a sensor interface control system is provided. The control system may include at least one interface module in communication with one or more sensors, and a sensor interface in communication with the interface module. The sensor interface may be configured to autonomously analyze sensor results using on-chip peripherals in a low energy mode of operation without intervention from an associated CPU. The sensor interface may include a sequencer in operative communication with the on-chip peripherals, a count and compare block in communication with the interface module and the sequencer, and a configurable decoder.

In a refinement, the interface module may include at least one analog comparator module, wherein each analog comparator module may be capable of communicating with up to 8 different analog sensors.

In another refinement, the sensor interface may be configured to automatically duty cycle a power mode of the on-chip peripherals to conserve energy.

In another refinement, the on-chip peripherals may include at least one or more of an analog comparator, a digital to analog converter, an analog to digital converter, a pulse counter and an oscillator.

In a related refinement, the sensor interface may be configured to communicate directly with the analog to digital converter to sample analog signals.

In another refinement, the decoder may be highly configurable and define a finite state machine, wherein the finite state machine may enable one of a plurality of different states based on measured sensor results, and wherein each state transition may be associated with a programmable action.

In another refinement, the decoder may communicate with a peripheral reflex system, wherein the peripheral reflex system may be configured to initiate a programmable action in response to each state transition.

In yet another refinement, the sensor interface may further include a memory block configured as an extended results buffer.

In yet another aspect of the present disclosure, a method of interfacing with one or more sensors is provided. The method may autonomously collect and analyze sensor results using direct control of on-chip peripherals, determine a current state based on the sensor results and a state machine, determine a next state based on detected changes in the sensor results and the state machine, and initiate a programmable action in response to a state transition from the current state to the next state while in a low energy mode of operation and without intervention from an associated CPU.

In a refinement, the programmable action may be executed through a peripheral reflex system, wherein the CPU may intervene only in response to interrupts generated when the action exceeds programmable limits of the peripheral reflex system.

In another refinement, a hysteresis function may be applied to the state transition between the current state and the next state so as to minimize unnecessary interrupt requests.

In yet another refinement, the method may further include a step of storing sensor results in an extended result buffer configured to prolong low energy mode operations.

Other advantages and features will be apparent from the following detailed description when read in conjunction with the accompanying diagrams and schematics.

BRIEF DESCRIPTION OF THE DRAWINGS

The ultra low power regulator apparatus and methods are described more or less diagrammatically in the accompanying drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of this disclosure or which render other details difficult to perceive may have been omitted. It should be understood, of course, that this disclosure is not limited to the particular embodiments and methods illustrated herein.

DETAILED DESCRIPTION OF THE DISCLOSURE

Figure 1:
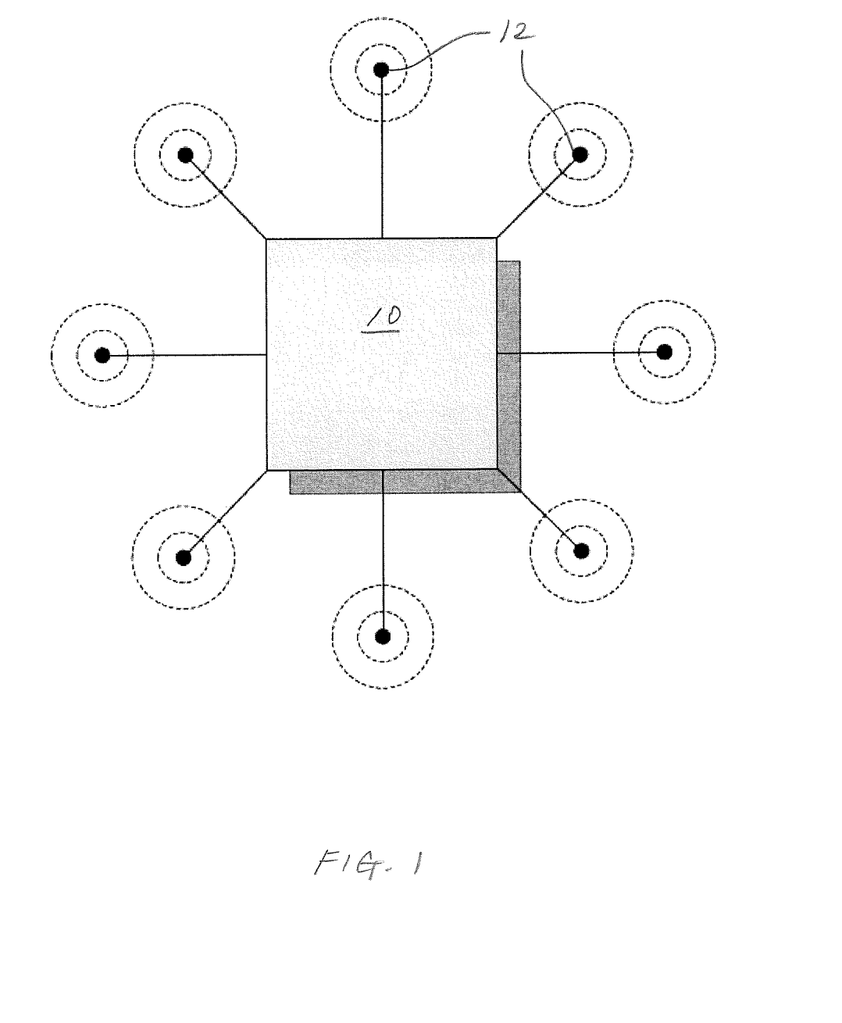
FIG. 1 is a general schematic view of a control system of microcontroller unit (MCU) that is configured with a sensor interface constructed in accordance with the present disclosure.

FIG. 1 illustrates one exemplary control system 10 constructed in accordance with the teachings of the present disclosure and adapted to simultaneously interact with one or more configurable sensors 12 associated therewith while in a deep sleep and/or a low power mode of operation. The control system 10 may take the form of, for instance, a microcontroller unit (MCU), or the like, and may be programmable to perform one or more desired functions from within an electronic environment. Among other things, the control system or MCU 10 may be preprogrammed to measure as well as monitor the outputs or results provided by the sensors 12, and to perform one or more predefined functions based on detected changes in the sensor results.

Figure 2:
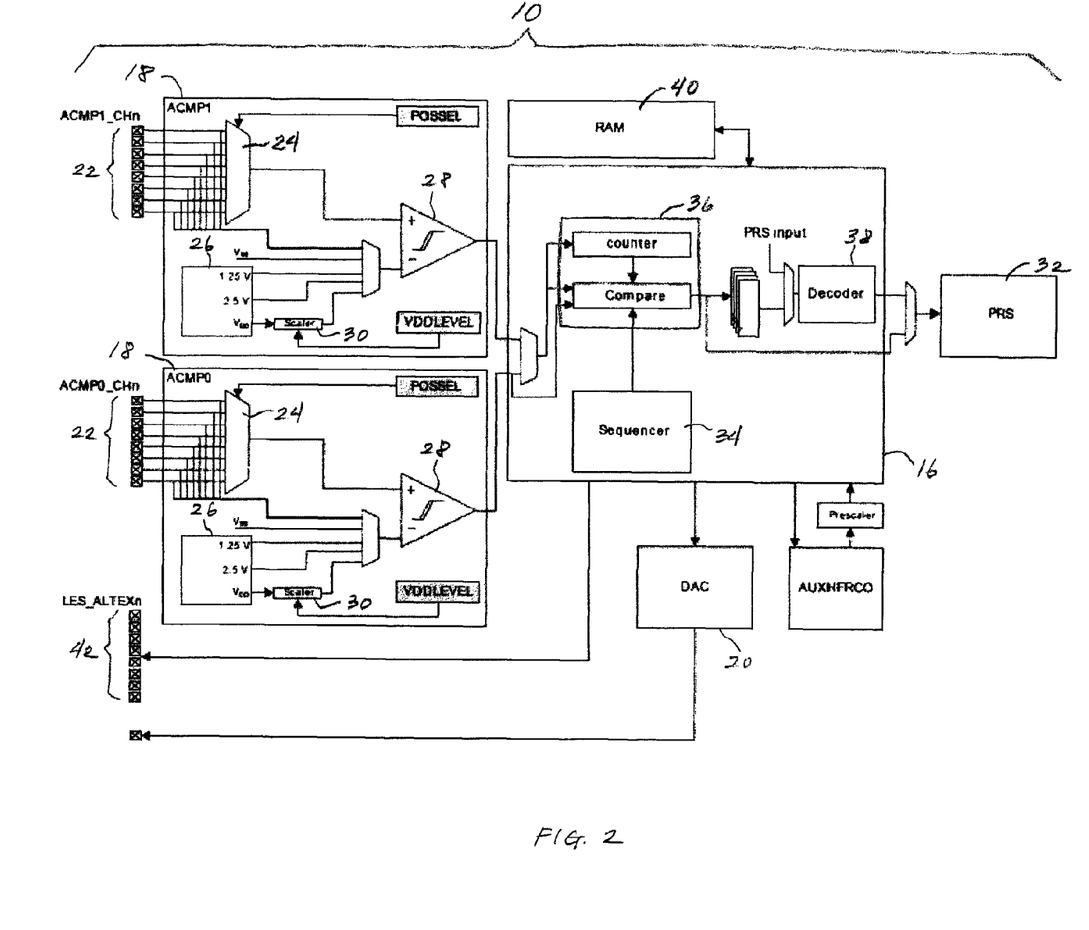
FIG. 2 is a detailed schematic view of one exemplary control system as configured to communicate with on-chip peripherals and sensors.
Figure 3:
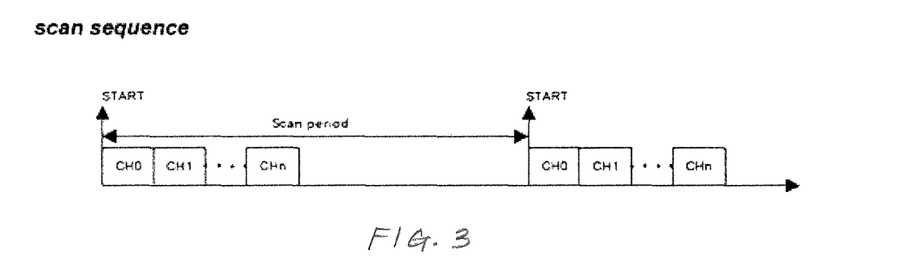
FIG. 3 is a graphical view of a scan sequence as executed by the control system.

While conventional sensor interface configurations may require frequent and substantial intervention from a central processing unit (CPU), and thus, consume more power, the control system 10 of FIG. 1 may be configured with an autonomous configuration which enables sensor interaction with no or minimal CPU involvement. Turning to FIG. 2, an exemplary schematic of one such control system 10 having a low energy sensor interface 16 is provided. The sensor interface 16 may be implemented within the control system 10 and configured to directly communicate with and/or operate one or more on-chip peripherals thereof, such as analog comparator modules 18, digital to analog converters 20, analog to digital converters, pulse counters, oscillators, and the like. For example, through its control of an interface module, such as the comparator modules 18 shown, the sensor interface 16 may be able to measure and monitor readings taken by sensors 12 that are coupled to channels 22 of the comparator modules 18. The sensors 12 may include any combination of capacitive sensors, inductive-capacitive sensors, resistive sensors such as light sensors and accelerometers, and any other suitable analog sensor types. Additionally, for those sensors 12 which require a reference voltage in order to operate, the sensor interface 16 may be configured to control the digital to analog converter 20 and accurately provide the reference voltage needed. The sensor interface 16 may further be adapted to communicate with analog to digital converters so as to enable sampling of analog sensors or other analog input signals. Furthermore, the pulse counter may be used by the sensor interface 16 to measure and track, for instance, the status or position of a sensor 12, the number of times the sensor 12 has been triggered and/or sensor events.

In the particular embodiment of FIG. 2, two comparator modules 18 may be provided, each comparator module 18 having eight channels 22 so as to provide support for up to sixteen configurable sensors 12. However, alternative modifications may provide a fewer or a greater number of channels 22, as well as a fewer or a greater number of analog comparator modules 18 in association with the sensor interface 16. Furthermore, each comparator module 18 in FIG. 2 may be an existing on-chip peripheral of the associated control system 10 generally including at least a multiplexer 24, a reference voltage 26 and a comparator 28. The sensor interface 16 may be configured to communicate directly with the multiplexer 24, a reference voltage 26 and a comparator 28 of each comparator module 18. More specifically, the sensor interface 16 may control the selection characteristics of the multiplexer 24, for example, through the POSSEL signal, as well as adjust a scaler 30 of the reference voltage 26, for example, through the VDDLEVEL signal. The sensor interface 16 may additionally receive comparison results provided by the comparator 28.

The sensor interface 16 of FIG. 2 may further communicate results of its analyses with an asynchronous peripheral reflex system 32 that may be incorporated into and/or associated with the control system 10. The peripheral reflex system 32 may serve as a means of enabling direct intercommunication between on-chip peripherals and bypassing the need for CPU intervention. More specifically, the peripheral reflex system 32 may be configured to produce the appropriate signals required to invoke one or more on-chip peripherals to perform an action while the associated CPU remains in a low energy mode of operation. In the embodiment of FIG. 2, for example, the peripheral reflex system 32 may be configured to enable direct communication between the pulse counter of the control system 10 and the sensor interface 16 while the CPU operates in a deep sleep mode of operation. The peripheral reflex system 32 may further communicate with the pulse counter of the CPU so as to keep track of sensor events. Thus, the peripheral reflex system 32 may autonomously execute less demanding actions corresponding to the sensor results analyzed and provided by the sensor interface 16. More demanding actions or sequence of events which exceed the programmable capacity of the peripheral reflex system 32 may trigger interrupts configured to wake and involve the CPU. In such a way, the sensor interface 16 may be able to minimize overall CPU involvement and maximize the time spent in low energy modes of operation. To further promote low energy consumption, the sensor interface 16 of the control system 10 may also be configured to automatically duty cycle the power mode of the on-chip peripherals, for example, between low power and high accuracy modes of operation.

Still referring to FIG. 2, the sensor interface 16 may essentially include a sequencer 34, a count and compare block 36, a decoder 38 and a memory block 40. The sequencer 34 may enable the sensor interface 16 to directly communicate with one or more on-chip peripherals associated with the control system 10, such as the analog comparator modules 18, the digital to analog converter 20, and the like. The sequencer 34 may control the multiplexer 24 in each comparator module 18 via the signal POSSEL, as well as the reference voltage 26 in each comparator module 18 via the signal VDDLEVEL. The sequencer 34 may also drive the digital to analog converter 20 in different power modes of operation in order to generate appropriate reference voltages for sensors 12 requiring such a reference. The sequencer 34 may further be configured to automatically shut down the comparator modules 18 and/or the digital to analog converter 20 when the sensors 12 and/or the sensor interface 16 are idle. Additionally, the sequencer 34 may communicate with the count and compare block 36 so as to manage the overall timing of sensor sampling and the measurement of sensor results. In response to the timing input provided by the sequencer 34, the count and compare block 36 may be configured to determine the status of a particular sensor 12 or whether the sensor 12 is active or not. Moreover, the count and compare block 36 may be configured to count pulses within a preset period of time prior to determining the sensor state, which may be advantageous in applications employing, for example, capacitive sensors. The count and compare block 36 may further communicate its findings to the decoder 38 for further processing.

The decoder 38 may be highly configurable and adapted to provide a finite state machine with a plurality of states. In the particular embodiment of FIG. 2, for instance, the decoder 38 may be configured to define a state machine of up to sixteen different states. Based on sensor results obtained through the count and compare block 36 and/or obtained directly from one of the comparator modules 18, the decoder 38 may be able to determine a current state and/or the next state to transition to. The decoder 38 may also be configured such that each transition between states is associated with a programmable action, which may be executed via the peripheral reflex system 32, so as to further enable autonomous analyses of sensor results with minimal or no CPU intervention and to prolong low energy modes of operation. In still further modifications, the decoder 38 of FIG. 2 may be configured to implement a variety of different decoding schemes, including but not limited to, for example, quadrature decoding schemes. Additionally, the memory block 40 may include random access memory (RAM) that is allotted for use by the sensor interface 16 to store the measurements of sensor results. Moreover, the memory block 40 may serve as an extended results buffer, in the form of a circular results buffer, or the like, configured to extend the time sensor results are retained and to prolong the duration of time spent in low energy modes of operation. Sensor results may also be stored in the memory block 40 so as to be retrievable by any of the CPU, direct memory access (DMA) controller, or the like, for further processing.

With reference to FIGS. 3-6, the sensor interface 16 may generally be configured to operate based on a pre-scaled clock signal, such as signal $LFACLK_{LES}$, which may be a pre-scaled modification of a low frequency clock signal, such as signal LFACLK. The degree of pre-scaling may be selected from a plurality of different predefined pre-scaling factors from within, for instance, a clock management unit (CMU), or the like, of the control system 10. An auxiliary high or low frequency clock signal, such as signal AUXHFRCO, or a pre-scale thereof, may also be employed for excitation timing, although with appropriate frequency constraints on the low frequency clock signal, LFACLK. During a sensor scan sequence, all enabled channels 22 of the comparator modules 18 as well as the associated sensor readings may be scanned per scan period. The frequency of the scan may be modified and configured according to different applications to produce different desired effects. For instance, in order to scan according to a counter, the scan frequency may be selected based on the pre-scaled clock signal, such as LFACLK$_{LES}$, and the pre-scaling factor, such as PCPRESC, associated therewith such that a new scan sequence is initiated every time the counter reaches an uppermost value, PCTOP. More specifically, the scan frequency, F$_{scan}$, may be determined using the equation, $$F_{scan} = \text{LFACLK}_{LES}/((1+\text{PCTOP})*2^{PCPRESC}). \quad (1)$$

Alternatively, additional sensor measurements or scans may be interleaved between pre-configured periodic scans without causing significant interference or disruption to the frequency of existing periodic scans. In still further alternatives, a single scan may be initiated based on input commands issued by the control system 10 and/or triggered by an event associated with the peripheral reflex system 32.

Figure 4:
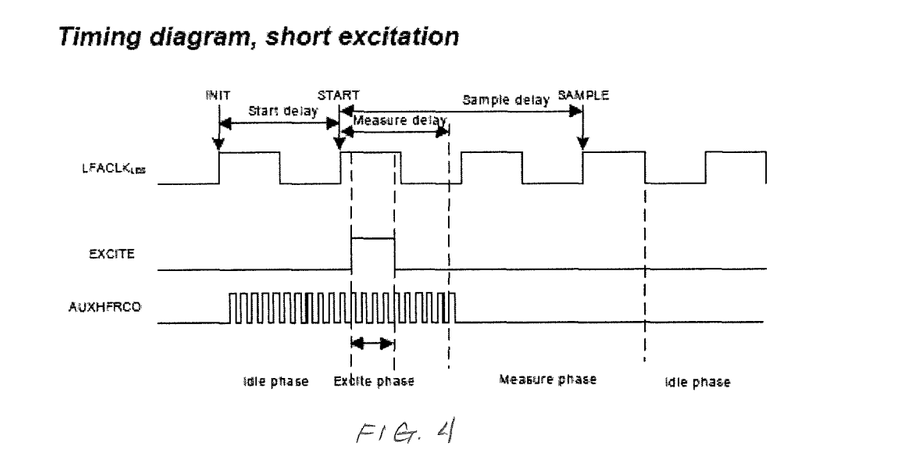
FIG. 4 is a graphical view of a timing diagram of the control system.
Figure 5:
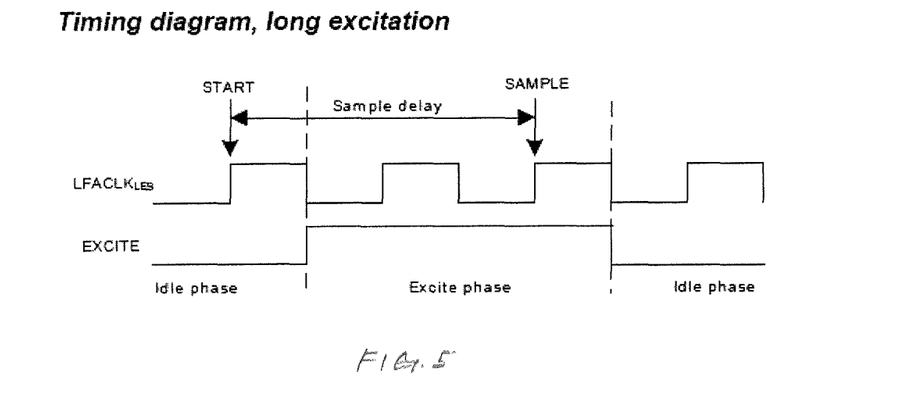
FIG. 5 is a graphical view of another timing diagram of the control system.
Figure 6:
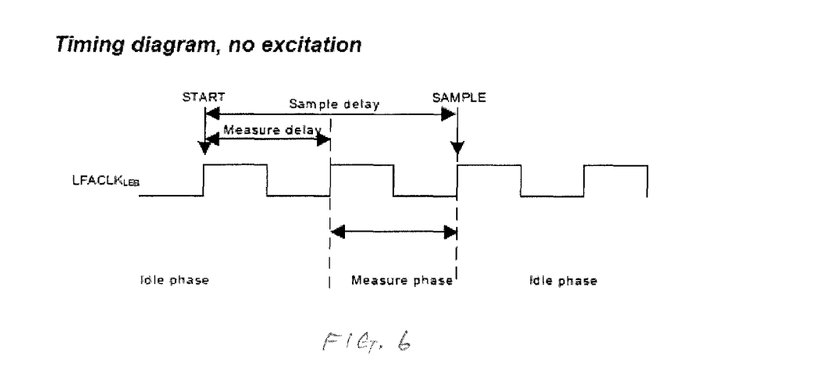
FIG. 6 is a graphical view of yet another timing diagram of the control system.

The sensor interface 16 may undergo three phases during the scan sequence for each channel 22 of the comparator modules 18 including, for instance, an idle phase, an excitation phase and a measurement phase. The duration of the idle phase may at least partially rely upon the durations of the excitation and measurement phases. The durations of the excitation and measurement phases may be configurable in the appropriate timing registers. In particular, the duration of the excitation phase may be designated as a number of cycles of the signal AXUHFRCO, or a pre-scaled signal thereof. Alternatively, the duration of the excitation phase may be designated as a number of cycles of the pre-scaled low frequency clock signal, LFACLK$_{LES}$. The duration of the measurement phase may be preprogrammed and configured such that the outputs of the comparator modules 18 are inactive during those cycles in which sensors 12 are measured. Sampling of the sensors 12 may be configured to begin after a configurable sample delay period, which may expire during the measure phase, immediately after the expiration of the measurement phase, during the excitation phase, or the like. As shown in the sequence of FIG. 4, for example, the excitation and measurement delays may be timed based on the signal AUXHFRCO to provide a relatively short excitation, while the sample delay may be timed based on the low frequency clock signal, LFACLK. In contrast, the excitation phase in the sequence of FIG. 5 may be timed based on the pre-scaled low frequency clock signal, LFACLK$_{LES}$, to provide for a relatively longer excitation, which may be used to enable external sensors, and the like. As shown in FIG. 6, the scan sequence may also be configured with no excitation phase and having only idle and measurement phases.

One or more of the sensors 12 that are coupled to the sensor channels 22 of the control system 10 may require excitation for proper operation. Accordingly, the sensor interface 16 may be configured to generate a variety of sensor stimuli, for example, through those channels 22 that are directly associated with the sensor 12 and also used for sensor measurements. During the excitation phase, the control system 10 may excite sensors 12 attached at its channels 22 using one or more of a plurality of available stimuli, such as an excitation that is configured as push pull and driven high, an excitation that is configured as push pull and driven low, an excitation that is provided through an output of an operational amplifier, or the like. In alternative embodiments, the sensor interface 16 may be configured such that only measurements are performed through a single set of sensor channels 22. In such configurations, the sensor interface 16 may be configured to, for instance, assign unused corresponding channels 22 of the alternate comparator module 18 as a means for providing sensor excitation. More specifically, if the first set of channels 22 belonging to the first comparator module 18, or ACMP0, is configured for measurements, the corresponding second set of channels 22 belonging to the alternate second comparator module 18, or ACMP1, may be mapped for sensor excitation. Similarly, if the second set of channels 22 belonging to the second comparator module 18, or ACMP1, is configured for measurements, the corresponding first set of channels 22 belonging to the alternate first comparator module 18, or ACMP0, may be used for sensor excitation. In still further modifications, the alternate channels 42 shown in FIG. 2 may be provided and configurable as excitation channels.

During the measurement phase, the count and compare block 36 of the sensor interface 16 of FIG. 2 may be configured to count pulses on the outputs of the comparator modules 18 to determine when the measurement phase is complete. Specifically, the count and compare block 36 may compare the count value to a preprogrammed threshold value until predefined conditions are satisfied. Moreover, the count and compare block 36 may be configured to initiate a trigger, an interrupt flag, or the like, if the count value is less than, greater than or equal to the threshold value. If the selected conditions for a comparison are satisfied for a particular channel 22, the sensor interface 16 may store the sensor result corresponding to the flagged channel 22, for instance, in the memory block 40. The control system 10 may additionally be configured to generate a trigger, an interrupt request, an interrupt flag, or the like, corresponding to other suitable sensor events. The sensor interface 16, such as via the signal POSSEL, may be configured to automatically control the multiplexer 24 so as to communicate or connect with the appropriate channel 22 that may have been flagged during a previous comparison. Furthermore, the value of the reference voltage used in association with the negative inputs of the comparators 28, and more particularly, the scaler 30 of each comparator module 18, may be adjusted by each of the channels 22. The digital to analog converter 20 may also be used to generate reference voltages for the analog comparator module 18. In alternative embodiments, the sensor interface 16 may be configured to sample a plurality of comparator modules 18 simultaneously so as to significantly reduce the time spent on sensor interactions. For example, in a dual sample mode of operation wherein both comparator modules 18 of FIG. 2 are sampled simultaneously, corresponding channels 22 of each comparator module 18 may be paired and sampled together.

Upon measuring a sensor reading, the sensor interface 16 may retrievably store the status of the sensor 12 in the memory block 40. Moreover, the sensor interface 16 may be configured such that the sensor status may be stored whether or not the count and compare block 36 determines that the count threshold has been reached. Based on the desired application, the sensor interface 16 may be configured to, for example, directly store the output value of each comparator module 18, the count value of each channel 22, or the like, in the RAM of the memory block 40. In other applications, the sensor interface 16 may be configured to store the result vector, which may be obtained after each sensor measurement and interleaved with corresponding count values. The memory block 40 may be configured as a circular buffer, for example, capable of storing up to 16 sensor results, and storing the results at increment locations therein. While the control system 10 may be configured such that no new data or results are stored in the results buffer when the results buffer is full, in alternative configurations, the results buffer may continue to store new results even when full. Contents stored within the results buffer of the memory block 40 may be retrieved or read directly through the appropriate registers through which the oldest unread result may be accessed first.

Furthermore, the control system 10 may be configured to provide a status of the results buffer corresponding to, for instance, when there is unread data in the results buffer, when the results buffer is half full, when the results buffer is full, when the results buffer overflows, or the like. Based on the status of the results buffer, for example, the sensor interface 16 may be able to issue a request to the DMA controller, or the like, to indicate when data is available. Still further, the sensor interface 16 may be configured such that one or more of the status events are associated with a status flag, interrupt, or the like.

Figure 7:
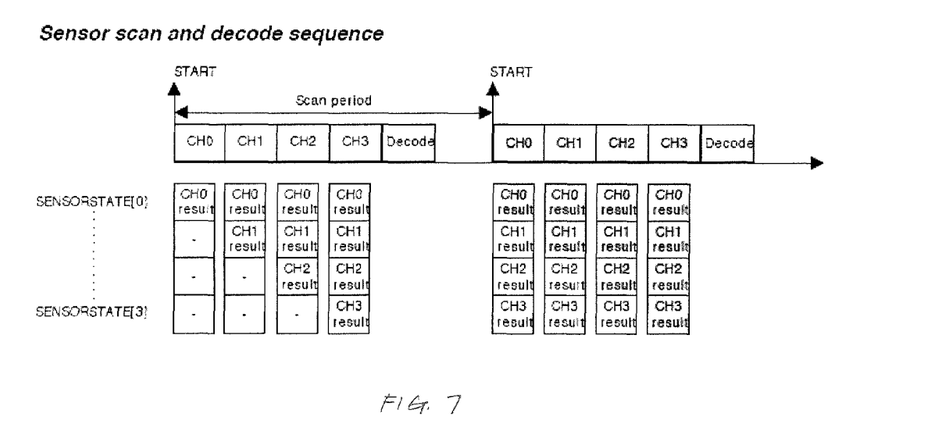
FIG. 7 is a graphical view of a scan and decode of the control system.

During a sensor scan or measurement, results from the sensors 12 may be shifted into a decoder register, as illustrated by the exemplary scan sequence of FIG. 7. As shown, the sensor results may be incrementally shifted toward the most significant bit (MSB), or the lowermost block. Once the scan sequence is complete, the decoder 38 may be configured to evaluate the status of those sensors 12 selected to be decoded, as illustrated by the exemplary decode sequence in FIG. 7. The decoder 38 may be configured to decode sensor readings using any one or more of a variety of different decoding schemes. For example, when applying a quadrature decoding scheme, the sensors 12 may be adapted to repeatedly pass through a set of states in the form of a sequence corresponding to the position of the sensors 12. Such a sequence may be interpreted by the sensor interface 16 in terms of a finite state machine. In order to enable sufficient decoding of such a sequence with minimal or no CPU involvement, the decoder 38 of FIG. 2 may be a highly configurable decoder capable of, for instance, decoding input provided by up to four sensors 12 and providing a programmable state machine with up to 16 states. In alternative embodiments, the decoder 38 may similarly be adapted to decode input from fewer or more sensors 12 and provide programmable state machines with fewer or more states.

Figure 8:
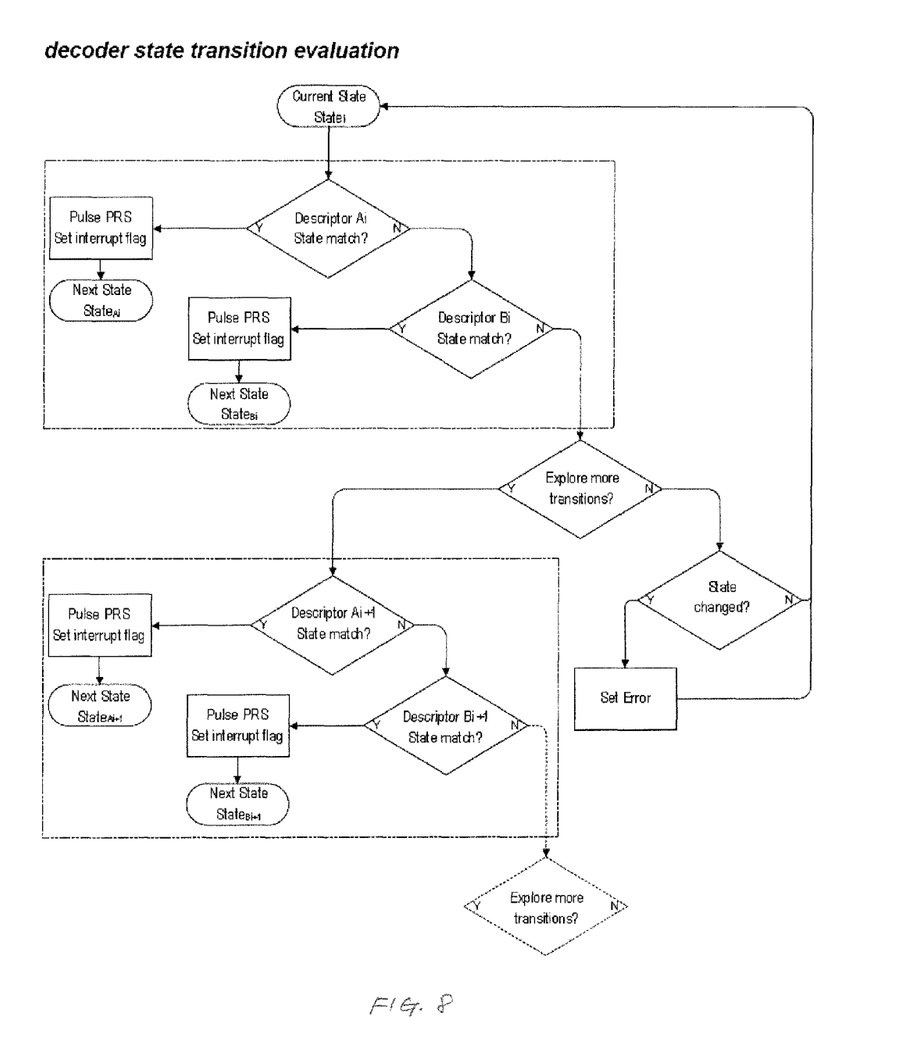
FIG. 8 is a diagrammatic view of an exemplary state transition evaluation of the control system.

With further reference to the flow diagram of FIG. 8, each state of the programmable state machine defined by the decoder 38 may be and individually identifiable and configured with an associated behavior. More specifically, each state of the state machine may be identifiable based on a set of descriptors associated therewith. Based on the descriptors and the associated sensor values, the decoder 38 may be able to determine the present or current state of operation as well as the next state of operation, if any such state transition is appropriate. Upon determination of a state transition, the sensor interface 16 may be configured to generate pulses or signals configured to initiate the actions or behaviors corresponding to the state transition. For example, the sensor interface 16 may communicate such quadrature signals directly to the peripheral reflex system 32, or indirectly through the on-chip pulse counter of the control system 10. As shown in FIG. 8, the decoder 38 may further be provided with an optional descriptor chaining function enabled to evaluate and explore more possible transitions for each state. For instance, if a first set of descriptors fails to define an appropriate state transition, the decoder 38 may proceed to the next available set of descriptors in order to evaluate the state transition. In still further modifications, the decoder 38 may optionally be configured to check the status of the sensors 12 for any error conditions. For example, the decoder 38 may monitor for any improper changes to the sensor status when no state transitions have been warranted or defined. If any such error conditions are detected, the decoder 38 may generate an interrupt flag to indicate the error.

Figure 9:
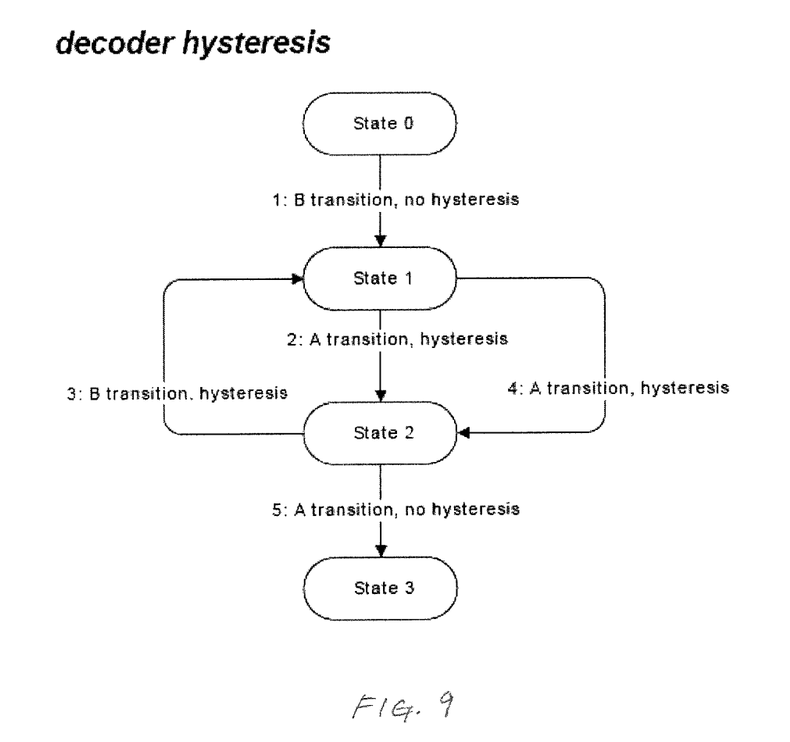
FIG. 9 is a diagrammatic view of a hysteresis function provided by the control system.

As further shown in FIG. 9, the sensor interface 16 may be configured with a hysteresis option intended to prevent excess interrupt requests or, for example, unnecessary calls to the peripheral reflex system 32 as the decoder 38 toggles between two or more states. The hysteresis function may be applied when a first transition type is preceded by a second transition type and vice versa. As shown in FIG. 9, for example, the hysteresis function may be triggered when a type A transition is preceded by a type B transition. The hysteresis function may be canceled when the descriptor chaining function is in effect and upon evaluation of the next set of descriptors as previously described and illustrated in FIG. 8. Furthermore, the hysteresis function may be configured to suppress one or more specific events including, for example, general signals to the peripheral reflex system 32, count signals associated with the peripheral reflex system 32, interrupt requests, and the like.

While only certain embodiments have been set forth, alternatives and modifications will be apparent from the above description to those skilled in the art. It should be further be understood that the drawings are not necessarily to scale and that the embodiments are sometimes illustrated by graphic symbols, phantom lines, diagrammatic representations and fragmentary views. In certain instances, details which are not necessary for an understanding of this disclosure or which render other details difficult to perceive may have been omitted. These and other alternatives are considered equivalents and within the spirit and scope of this disclosure.

INDUSTRIAL APPLICABILITY

In satisfaction of the above-identified needs, improved apparatus and methods are disclosed for providing control systems with effective and more energy efficient means for monitoring, interfacing with and responding to sensors. The present disclosure is capable of interacting with a wide variety of sensors including capacitive, inductive-capacitive, resistive, and other analog sensor types. For example, the present disclosure is configured to count pulses within a predefined duration of time prior to determining the sensor state, which may be desirable for capacitive type sensors. Furthermore, the sensor interaction provided by the present disclosure is highly and individually configurable. Moreover, the present disclosure improves upon sensor processing accuracy by comparing sensor values against thresholds prior to establishing the state of the sensor and initiating decoding schemes.

The present disclosure additionally enables direct and sophisticated control of on-chip peripherals associated with the MCU, such as analog comparators, digital to analog converters, analog to digital converters, pulse counters, oscillators, and the like, so as to minimize CPU intervention and conserve energy. The sensor interface of the present disclosure is also capable of automatically duty cycling the power mode of the on-chip peripherals, for instance, between low power and high accuracy modes, in order to further promote low energy consumption. The present disclosure is additionally advantageous as it provides a substantially large, or extended, results buffer so as to prolong operations carried out in the low energy modes of the CPU.

While only certain embodiments have been set forth, alternatives and modifications will be apparent from the above description to those skilled in the art. These and other alternatives are considered equivalents and within the spirit and scope of this disclosure and the appended claims.

What is claimed:

1. A low energy sensor interface for a control system, comprising:
a sequencer in operative communication with one or more on-chip peripherals;
a count and compare block in communication with one or more sensors and the sequencer; and
a configurable decoder;
wherein the sequencer, the count and compare block and the decoder are configured to autonomously collect and analyze sensor results using the on-chip peripherals and determine a state transition from a current state to a next state based on the sensor signals while in a low energy mode of operation without intervention from an associated central processing unit (CPU).

2. The sensor interface of claim 1, wherein the configurable decoder is capable of communicating with an analog comparator.

3. The sensor interface of claim 1, wherein the on-chip peripherals include at least one or more of an analog comparator, a digital to analog converter, an analog to digital converter, a pulse counter and an oscillator.

4. The sensor interface of claim 1, wherein the sequencer is further configured to manage timing of sensor measurements.

5. The sensor interface of claim 1 further comprising random access memory (RAM) configured as a circular results buffer for storing operational configurations and measured sensor results.

6. The sensor interface of claim 1, wherein the configurable decoder defines a programmable state machine, the state machine enabling one of a plurality of different states based on the measured sensor results, each state transition being associated with a programmable action.

7. The sensor interface of claim 6, wherein the state machine provides at least 16 different programmable states.

8. The sensor interface of claim 1, wherein the decoder is capable of quadrature decoding.

9. A sensor interface control system, comprising:
an interface module in communication with one or more sensors; and
a sensor interface in communication with the interface module and configured to autonomously analyze sensor results using on-chip peripherals and determine a state transition from a current state to a next state based on the sensor signals while in a low energy mode of operation without intervention from an associated central processing unit (CPU), the sensor interface having a sequencer in operative communication with the on-chip peripherals, a count and compare block in communication with the interface module and the sequencer, and a configurable decoder.

10. The control system of claim 9, wherein the interface includes at least one analog comparator module, each analog comparator module capable of communicating with up to 8 different analog sensors.

11. The control system of claim 9, wherein the sensor interface is configured to automatically duty cycle a power mode of the on-chip peripherals to conserve energy.

12. The control system of claim 9, wherein the on-chip peripherals include at least one or more of an analog comparator, a digital to analog converter, an analog to digital converter, a pulse counter and an oscillator.

13. The control system of claim 12, wherein the sensor interface is configured to communicate directly with at least one of the analog comparator, the digital to analog converter, the analog to digital converter, the pulse counter and the oscillator.

14. The control system of claim 9, wherein the decoder is configurable and defines a finite state machine, the finite state machine enabling one of a plurality of different states based on measured sensor results, each state transition being associated with a programmable action.

15. The control system of claim 9, wherein the decoder communicates with a peripheral reflex system, the peripheral reflex system being configured to initiate a programmable action in response to each state transition, the sensor interface being configured to keep track of sensor events.

16. The control system of claim 9, wherein the sensor interface further includes a memory block configured as an extended results buffer.

17. A method of interfacing with one or more sensors, comprising the steps of:
autonomously collecting and analyzing, at one or more count and compare blocks, sensor results using direct control of on-chip peripherals;
determining, at a decoder, a current state based on the sensor results and a state machine;
determining, at the decoder, a next state based on detected changes in the sensor results and the state machine; and
initiating, through the decoder, a programmable action in response to a state transition from the current state to the next state while in a low energy mode of operation and without intervention from an associated central processing unit (CPU).

18. The method of claim 17, wherein the programmable action is executed through a peripheral reflex system, the CPU intervening only in response to interrupts generated when the action exceeds programmable limits of the peripheral reflex system.

19. The method of claim 17, wherein a hysteresis function is applied to the state transition between the current state and the next state so as to minimize unnecessary interrupt requests.

20. The method of claim 17 further comprising a step of storing sensor results in an extended result buffer configured to prolong low energy mode operations.

* * * * *